United States Patent
Adachi et al.

(10) Patent No.: US 12,436,118 B2
(45) Date of Patent: Oct. 7, 2025

(54) MEASUREMENT SYSTEM AND MEASUREMENT METHOD

(71) Applicant: Kobe Steel, Ltd., Kobe (JP)

(72) Inventors: Hitomi Adachi, Takasago (JP); Mariko Matsuda, Takasago (JP); Ryota Yakura, Takasago (JP); Tatsuhiko Kabutomori, Takasago (JP)

(73) Assignee: Kobe Steel, Ltd., Kobe (JP)

( * ) Notice: Subject to any disclaimer, the term of this patent is extended or adjusted under 35 U.S.C. 154(b) by 306 days.

(21) Appl. No.: 18/043,988

(22) PCT Filed: Aug. 18, 2021

(86) PCT No.: PCT/JP2021/030153
§ 371 (c)(1),
(2) Date: Mar. 3, 2023

(87) PCT Pub. No.: WO2022/054511
PCT Pub. Date: Mar. 17, 2022

(65) Prior Publication Data
US 2023/0324316 A1 Oct. 12, 2023

(30) Foreign Application Priority Data
Sep. 10, 2020 (JP) .................... 2020-152007

(51) Int. Cl.
*G01N 23/20008* (2018.01)
*G01L 1/25* (2006.01)
(Continued)

(52) U.S. Cl.
CPC ..... *G01N 23/203* (2013.01); *G01N 23/20008* (2013.01); *G01N 23/205* (2013.01);
(Continued)

(58) Field of Classification Search
None
See application file for complete search history.

(56) References Cited

U.S. PATENT DOCUMENTS

| | | | | |
|---|---|---|---|---|
| 3,868,506 A | * | 2/1975 | Ogiso .................. | G01N 23/207 378/197 |
| 4,561,062 A | * | 12/1985 | Mitchell .............. | G01N 23/207 702/42 |

(Continued)

FOREIGN PATENT DOCUMENTS

| JP | S6017735 Y2 * | 5/1985 |
|---|---|---|
| JP | 2005-227138 A | 8/2005 |

(Continued)

OTHER PUBLICATIONS

Written Opinion of the International Searching Authority issued Nov. 9, 2021 in PCT/JP2021/030153, 4 pages.

(Continued)

*Primary Examiner* — Thomas R Artman
(74) *Attorney, Agent, or Firm* — Oblon, McClelland, Maier & Neustadt, L.L.P.

(57) ABSTRACT

A measurement system according to an aspect of the present invention enables measurement of an intensity distribution of diffracted X-rays obtained by irradiating a fillet portion of a metallic structure with X-rays, the metallic structure comprising: an axis portion; and a flange portion protruding radially from the axis portion, wherein the metallic structure comprises the fillet portion in a connection portion between the axis portion and the flange portion, the measurement system including: a diffracted X-rays measurement device provided with an irradiation unit that irradiates the fillet portion with X-rays; and a positioning device that positions the diffracted X-rays measurement device with respect to the fillet portion, in which the positioning device including: a moving mechanism that moves three-dimensionally the dif- (Continued)

fracted X-rays measurement device relative to the fillet portion; and a rotation mechanism that rotates the diffracted X-rays measurement device in such a direction that an angle of incidence of the X-rays with respect to the fillet portion is changed.

11 Claims, 9 Drawing Sheets

(51) Int. Cl.
    *G01L 5/00*         (2006.01)
    *G01N 23/203*     (2006.01)
    *G01N 23/205*     (2018.01)
    *G01N 23/2055*    (2018.01)

(52) U.S. Cl.
    CPC ............ *G01N 23/2055* (2013.01); *G01L 1/25* (2013.01); *G01L 5/0047* (2013.01); *G01N 2223/053* (2013.01); *G01N 2223/0566* (2013.01); *G01N 2223/306* (2013.01); *G01N 2223/607* (2013.01)

(56) References Cited

U.S. PATENT DOCUMENTS

| | | | |
|---|---|---|---|
| 6,925,146 B2 * | 8/2005 | Brauss | G01N 23/20008 378/81 |
| 7,283,612 B2 * | 10/2007 | Brausss | G01N 23/20008 378/81 |
| 7,646,848 B2 | 1/2010 | Suominen | |
| 8,102,967 B2 * | 1/2012 | Suominen | G01N 23/20016 378/81 |
| 10,914,692 B2 * | 2/2021 | Takamatsu | G01L 1/00 |
| 11,221,304 B2 * | 1/2022 | Takamatsu | G01L 1/25 |
| 12,241,803 B2 * | 3/2025 | Matsuda | G01L 5/0047 |
| 2004/0184580 A1 * | 9/2004 | Brauss | G01N 23/20 378/70 |
| 2005/0281375 A1 * | 12/2005 | Brauss | G01N 23/20008 378/81 |
| 2007/0071170 A1 * | 3/2007 | Brauss | G01N 23/20008 378/81 |
| 2007/0291899 A1 * | 12/2007 | Suominen | G01N 23/20016 378/81 |
| 2010/0046708 A1 * | 2/2010 | Suominen | G01N 23/20016 378/81 |
| 2020/0072769 A1 * | 3/2020 | Takamatsu | G01L 1/00 |
| 2020/0141885 A1 * | 5/2020 | Takamatsu | G01L 1/25 |
| 2021/0055173 A1 * | 2/2021 | Matsuda | G01L 1/25 |
| 2023/0304876 A1 * | 9/2023 | Matsuda | G01L 5/0047 |
| 2023/0324316 A1 * | 10/2023 | Adachi | G01N 23/2055 378/71 |

FOREIGN PATENT DOCUMENTS

| | | | | |
|---|---|---|---|---|
| JP | 2012-225796 A | | 11/2012 | |
| JP | 2014106004 A | * | 6/2014 | |
| JP | 2017156263 A | * | 9/2017 | |
| JP | 2017187352 A | * | 10/2017 | |
| JP | 6607127 B2 | | 11/2019 | |
| WO | WO-2014102919 A1 | * | 7/2014 | ............ G01L 1/25 |
| WO | WO 2014/128874 A1 | | 8/2014 | |

OTHER PUBLICATIONS

Extended European Search Report issued Dec. 20, 2023 in European Patent Application No. 21866471.2, 11 pages.
Extended European Search Report issued Dec. 20, 2023 in European Patent Application No. 21866471.2, citing references 15-16 therein, 11 pages.

* cited by examiner

MEASUREMENT SYSTEM AND MEASUREMENT METHOD

TECHNICAL FIELD

The present invention relates to a measurement system and a measurement method.

BACKGROUND ART

Recently, a technique for measuring a residual stress using X-rays has been widely applied. In this technique, a lattice distortion occurring inside a specimen having a crystalline structure is measured using X-rays, and the measurement result is converted into a residual stress.

As a method for measuring a residual stress using X-rays, a cos α method is known. The cos α method includes: irradiating a specimen with X-rays at a specific angle of incidence; two-dimensionally detecting intensities of diffracted X-rays generated by reflection of the X-rays by the specimen; and measuring a residual stress based on a diffraction ring formed by an intensity distribution of the diffracted X-rays as detected.

Today, determining hardness and the like of a specimen through calculation of a half width of an X-ray diffraction intensity curve based on an intensity distribution of the diffracted X-rays is also practiced.

An X-ray stress measuring apparatus in which an X-ray emitter that emits X-rays, an imaging plate on which a diffraction ring due to diffracted X-rays is formed, and the like are disposed in a single housing (see Japanese Unexamined Patent Application, Publication No. 2012-225796) can be used as an X-ray stress measuring apparatus for measuring a residual stress of a fillet portion in a metal structure including: an axis portion having a cylindrical shape; and a flange portion (plate-shaped portion) protruding radially from the axis portion, wherein the fillet portion for alleviating stress concentration is provided in a connection portion between the axis portion and the flange portion.

PRIOR ART DOCUMENTS

Patent Documents

Patent Document 1: Japanese Unexamined Patent Application, Publication No. 2012-225796

SUMMARY OF THE INVENTION

Problems to be Solved by the Invention

In the measurement of the residual stress by the cos α method, the angle of incidence is typically set to be greater than or equal to 15° and less than or equal to 65°. However, with regard to a metal structure including: an axis portion having a cylindrical shape; and a flange portion (plate-shaped portion) protruding radially from the axis portion, wherein a fillet portion for alleviating stress concentration is provided in a connection portion between the axis portion and the flange portion, for example in a case of irradiating a plurality of positions in the fillet portion with X-rays, there is a higher risk of interference between the flange portion or the axis portion and the X-ray stress measuring apparatus, leading to difficulty in arranging the X-ray stress measuring apparatus in a desired position.

The present invention was made in view of the foregoing circumstances, and an object of the present invention is to provide a measurement system and a measurement method that enable easy measurement of an intensity distribution of diffracted X-rays in a desired arrangement.

Means for Solving the Problems

A measurement system according to an aspect of the present invention enables measurement of an intensity distribution of diffracted X-rays obtained by irradiating a fillet portion of a metallic structure with X-rays, the metallic structure comprising: an axis portion; and a flange portion protruding radially from the axis portion, wherein the metallic structure comprises the fillet portion in a connection portion between the axis portion and the flange portion, the measurement system including: a diffracted X-rays measurement device provided with an irradiation unit that irradiates the fillet portion with X-rays; and a positioning device that positions the diffracted X-rays measurement device with respect to the fillet portion, in which the positioning device includes: a moving mechanism that moves three-dimensionally the diffracted X-rays measurement device relative to the fillet portion; and a rotation mechanism that rotates the diffracted X-rays measurement device in such a direction that an angle of incidence of the X-rays with respect to the fillet portion is changed.

The measurement system includes a positioning device that positions the diffracted X-rays measurement device with respect to the fillet portion, in which the positioning device includes: a moving mechanism that moves three-dimensionally the diffracted X-rays measurement device relative to the fillet portion; and a rotation mechanism that rotates the diffracted X-rays measurement device in such a direction that an angle of incidence of the X-rays with respect to the fillet portion is changed, whereby an intensity distribution of diffracted X-rays obtained by irradiating the fillet portion with X-rays can be easily measured in a desired arrangement.

It is preferred that the measurement system further includes a control unit that controls movement by the moving mechanism and rotation by the rotation mechanism such that the diffracted X-rays measurement device does not come into contact with the axis portion and the flange portion. The measurement system can measure the intensity distribution of the diffracted X-rays more easily in a desired arrangement due to further comprising a control unit that controls movement by the moving mechanism and rotation by the rotation mechanism such that the diffracted X-rays measurement device does not come in contact with the axis portion and the flange portion.

It is preferred that the control unit controls the movement by the moving mechanism and the rotation by the rotation mechanism within such a range that the diffracted X-rays measurement device can detect a peak of diffracted X-rays. Due to the control unit thus controlling the movement by the moving mechanism and the rotation by the rotation mechanism within such a range that the diffracted X-rays measurement device can detect a peak of diffracted X-rays, the intensity distribution of the diffracted X-rays can be measured easily and reliably.

In a case in which: an axis passing through a fillet center and being parallel to a central axis of the axis portion is represented by an X-axis; an axis passing through the fillet center and being parallel to a protrusion direction of the flange portion is represented by a Z-axis; a coordinate of the fillet center is represented by (0, 0); a coordinate of a rotation center of the diffracted X-rays measurement device is represented by (X, Z); an irradiation distance of the X-rays by the diffracted X-rays measurement device is denoted by L [mm]; a minimum value of the irradiation distance of the X-rays is denoted by $L_{min}$ [mm]; a maximum value of the irradiation distance of the X-rays is denoted by $L_{max}$ [mm]; a fillet angle is denoted by θ [°]; a fillet radius is denoted by R [mm]; an angle of incidence of the X-rays is denoted by Ψ[°]; a distance between an end portion of a housing of the diffracted X-rays measurement device on the fillet portion side and the rotation center in the irradiation direction of the X-rays is denoted by h [mm]; a top-to-bottom width of an end portion of the housing on a side adjacent to the fillet portion is denoted by W [mm]; a complementary angle of the Bragg angle is denoted by η [°]; a top-to-bottom width of a detection region of a two-dimensional detector of the diffracted X-rays measurement device is denoted by D [mm], and an interval between the flange portion and an imaginary straight line which passes through the fillet center and is parallel to the flange portion is denoted by a [mm], it is preferred that the following inequality 1 and inequality 2 are satisfied:

$$(L_{min}+h)\sin(\theta+\psi)-R\sin\theta \leq X \leq (L_{max}+h)\sin(\theta+\psi)-R\sin\theta \quad\quad 1$$

$$(L_{min}+h)\cos(\theta+\psi)-R\cos\theta \leq Z \leq (L_{max}+h)\cos(\theta+\psi)-R\cos\theta \quad\quad 2$$

wherein with respect to an imaginary straight line which passes through a measurement site and the fillet center, the angle of incidence Ψ of the X-rays is defined to be positive in a case of tilting toward the axis portion, and is defined to be negative in a case of tilting toward the flange portion: in a case in which Ψ≥0, the irradiation distance L of the X-rays satisfies the following inequality 3; and in a case in which Ψ<0, the irradiation distance L of the X-rays satisfies the following inequality 4:

$$\frac{-R(1-\cos\theta)+\frac{W}{2}\sin(\theta+\Psi)}{\cos(\theta+\Psi)} \leq L \leq \frac{D}{2\tan\eta} \quad\quad 3$$

$$\frac{R\sin\theta+\frac{W}{2}\cos(\theta+\Psi)-a}{\sin(\theta+\Psi)} \leq L \leq \frac{D}{2\tan\eta} \quad\quad 4$$

Due to positioning the diffracted X-rays measurement device within a range that satisfies the above inequalities 1 and 2, the measurement system can easily inhibit contact of the axis portion and the flange portion with the diffracted X-rays measurement device.

It is preferred that the control unit controls the movement by the moving mechanism and the rotation by the rotation mechanism on basis of the following inequality 5 in a case in which Ψ≥0, and controls the movement by the moving mechanism and the rotation by the rotation mechanism on basis of the following inequality 6 in a case in which Ψ<0, $$Z \geq -R+h\cos(\theta+\Psi)+\frac{W}{2}\sin(\theta+\Psi) \quad\quad 5$$

$$X \geq -a+h\sin(\theta+\Psi)+\frac{W}{2}\cos(\theta+\Psi) \quad\quad 6$$

Due to the control unit thus controlling the movement by the moving mechanism and the rotation by the rotation mechanism on the basis of the above inequalities 5 and 6, the intensity distribution of the diffracted X-rays can be measured easily and reliably, while contact of the axis portion and the flange portion with the diffracted X-rays measurement device is inhibited.

It is preferred that the moving mechanism includes: a first moving body that fits to an outer peripheral face of the axial portion and rotates in a circumferential direction relative to the axial portion; a perpendicular axis that is connected to the first moving body and extends in a direction orthogonal to the central axis of the axis portion; a second moving body that is connected to the perpendicular axis and movable in an axial direction of the perpendicular axis; and a slide mechanism that moves the first moving body or the perpendicular axis in an axial direction of the axis portion, in which the diffracted X-rays measurement device is connected to the second moving body. Due to the moving mechanism thus including: a first moving body that fits to an outer peripheral face of the axial portion and rotates in a circumferential direction relative to the axial portion; a perpendicular axis that is connected to the first moving body and extends in a direction orthogonal to the central axis of the axis portion; a second moving body that is connected to the perpendicular axis and movable in an axial direction of the perpendicular axis; and a slide mechanism that moves the first moving body or the perpendicular axis in an axial direction of the axis portion, in which the diffracted X-rays measurement device is connected to the second moving, the intensity distribution of the diffracted X-rays can be more easily measured in a desired arrangement.

It is preferred that the diffracted X-rays measurement device is configured to be able to calculate a residual stress of the fillet portion by the cos α method. The measurement system being able to easily measure the intensity distribution of the diffracted X-rays in a desired arrangement is suitable for calculating the residual stress of the fillet portion.

It is preferred that the diffracted X-rays measurement device is configured to be able to calculate a half width of an X-ray diffraction intensity curve. The measurement system being able to easily measure the intensity distribution of the diffracted X-rays in a desired arrangement is suitable for calculating the half width of the X-ray diffraction intensity curve.

A measurement method according to another aspect of the present invention enables measurement of an intensity distribution of diffracted X-rays obtained by irradiating a fillet portion of a metallic structure with X-rays, the metallic structure comprising: an axis portion; and a flange portion protruding radially from the axis portion, wherein the metallic structure comprises the fillet portion in a connection portion between the axis portion and the flange portion, the measurement method using a diffracted X-rays measurement device provided with an irradiation unit that irradiates the fillet portion with X-rays, and including: moving three-dimensionally the diffracted X-rays measurement device relative to the fillet portion; rotating the diffracted X-rays measurement device in such a direction that an angle of incidence of the X-rays with respect to the fillet portion is changed; and measuring the intensity distribution of diffracted X-rays by the diffracted X-rays measurement device.

Due to the measurement method including moving three-dimensionally the diffracted X-rays measurement device relative to the fillet portion; and rotating the diffracted X-rays measurement device in such a direction that an angle of incidence of the X-rays with respect to the fillet portion is changed, an intensity distribution of diffracted X-rays obtained by irradiating the fillet portion with X-rays can be easily measured in a desired arrangement.

It is preferred that, in the measurement, the residual stress of the fillet portion is calculated by the cos α method. The measurement method being able to easily measure the intensity distribution of the diffracted X-rays in a desired arrangement is suitable for calculating the residual stress of the fillet portion.

It is preferred that, in the measurement, a half width of an X-ray diffraction intensity curve is calculated. The measurement method being able to easily measure the intensity distribution of the diffracted X-rays in a desired arrangement is suitable for calculating the half width of the X-ray diffraction intensity curve.

It is preferred that: the fillet portion is continuously irradiated with X-rays in parallel with at least one of the moving and the rotating; and in the measurement, a single diffraction ring, which is given by overlapping a plurality of diffraction rings generated by diffraction of the X-rays, is determined. Due to the fillet portion thus being continuously irradiated with X-rays in parallel with at least one of the moving and the rotating, and a single diffraction ring, which is given by overlapping a plurality of diffraction rings generated by diffraction of the X-rays, being obtained in the measurement, easy and highly accurate calculation of the residual stress or the half width is enabled.

It is preferred that the measurement method includes, after the measuring, repeating: at least one of the moving and the rotating; and the measuring. Due to thus including, after the measuring, repeating: at least one of the moving and the rotating; and the measuring, more accurate calculation of the residual stress or the half width is enabled.

It is preferred that the measurement method further includes determining an average value of a plurality of calculated values obtained by the measuring. Due to thus further including determining an average value of a plurality of calculated values obtained by the measuring, easy and highly accurate measurement of the residual stress or the half width is enabled.

It is to be noted that according to the present invention, the "fillet center" as referred to herein means a center of curvature of the fillet portion. The "fillet angle" as referred to herein means an angle in a side view, formed between an imaginary straight line which passes through the fillet center and is orthogonal to the axis portion, and an imaginary straight line which passes through the measurement site and the fillet center (see θ in FIG. 2). The "fillet radius" as referred to herein means a radius of curvature of the fillet portion. The "top-to-bottom width" as referred to herein means a width between a surface being on a side adjacent to the axis portion, and a surface opposed to this surface and being on a side adjacent to the flange portion. The "interval between the flange portion and the imaginary straight line which passes through the fillet center and is parallel to the flange portion" as referred to herein means an average value of intervals at 5 arbitrary points between the imaginary straight line and the flange portion (excluding the fillet portion).

Effects of the Invention

As described above, the measurement system according to an aspect of the present invention and the measurement method according to another aspect of the present invention enable easy measurement of the intensity distribution of the diffracted X-rays in a desired arrangement.

DESCRIPTION OF EMBODIMENTS

Hereinafter, embodiments of the present invention are described in detail with reference to the drawings.

Measurement System

Figure 1:
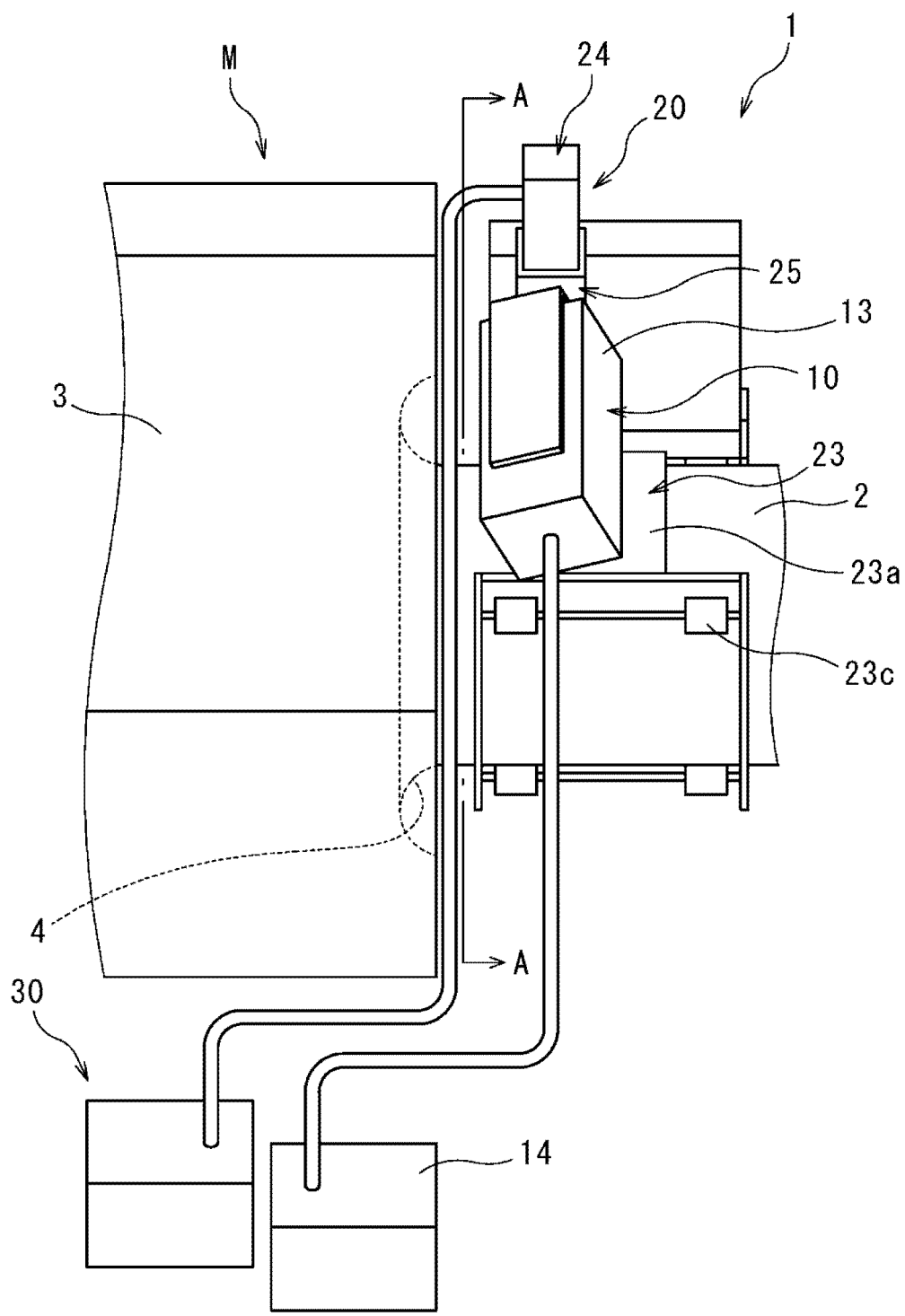
FIG. 1 is a schematic perspective view illustrating a state of the measurement system according to an embodiment of the present invention in use.
Figure 2:
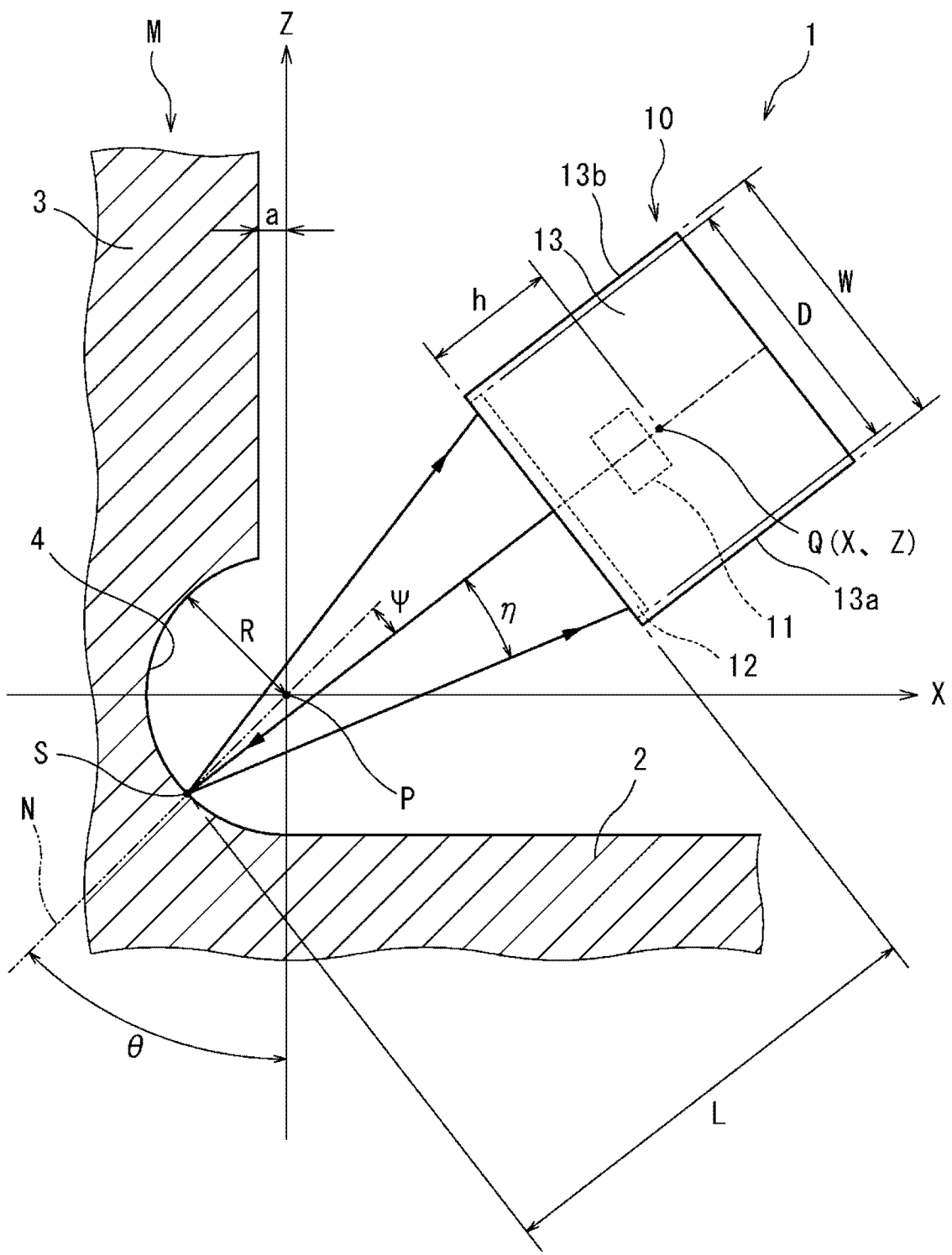
FIG. 2 is a schematic side view illustrating a state in which the residual stress of the fillet portion is measured by a diffracted X-rays measurement device of the measurement system in FIG. 1.
Figure 3:
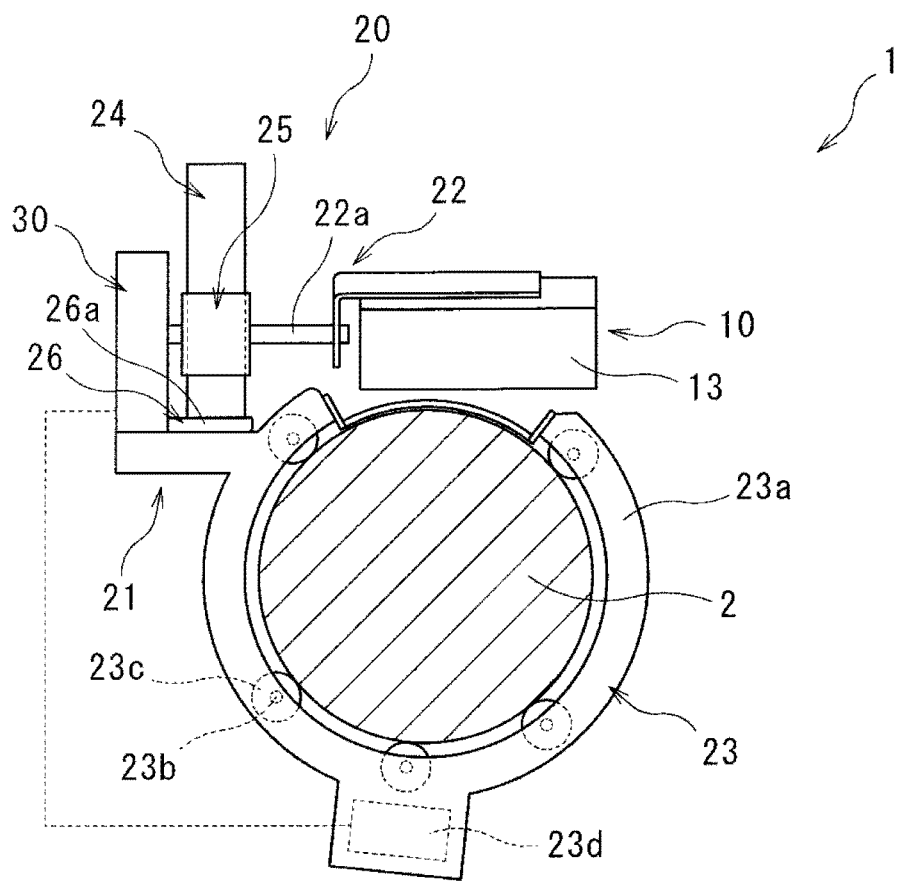
FIG. 3 is a schematic cross-sectional view taken along A-A line, illustrating the major portion of the moving mechanism of the measurement system in FIG. 1.

As illustrated in FIGS. 1 and 2, a measurement system 1 measures an intensity distribution of diffracted X-rays obtained by irradiating with X-rays a fillet portion 4 of a metallic structure M, the metallic structure M including: an axis portion 2; and a flange portion 3 protruding radially from the axis portion 2, in which the metallic structure M includes the fillet portion 4 in a connection portion between the axis portion 2 and the flange portion 3. The flange portion 3 protrudes in a direction perpendicular to a central axis of the axis portion 2. As illustrated in FIG. 2, the measurement system 1 includes a diffracted X-rays measurement device 10 provided with an irradiation unit 11 that irradiates the fillet portion 4 with X-rays. The diffracted X-rays measurement device 10 is exemplified by an X-ray stress measuring apparatus. In addition, as shown in FIG. 1 and FIG. 3, the measurement system 1 includes a positioning device 20 that positions the diffracted X-rays measurement device 10 with respect to the fillet portion 4. Furthermore, as shown in FIG. 1 and FIG. 3, the measurement system 1 includes a control unit 30 that controls operation of the diffracted X-rays measurement device 10 by the positioning device 20 such that the diffracted X-rays measurement device 10 does not come into contact with the axis portion 2 and the flange portion 3.

Diffracted X-Rays Measurement Device

As shown in FIG. 2, the diffracted X-rays measurement device 10 includes an irradiation unit 11 which delivers X-rays; a two-dimensional detector 12 which detects a diffraction ring generated by Bragg diffraction of the X-rays delivered from the irradiation unit 11 to the fillet portion 4 (more specifically, a measurement site S in the fillet portion 4); and a housing 13 in which the irradiation unit 11 and the two-dimensional detector 12 are mounted. The diffracted X-rays measurement device 10 is configured to be able to calculate a residual stress of the fillet portion 4 by the cos α method. Specifically, the diffracted X-rays measurement device 10 is configured to be able to irradiate the measurement site S with X-rays, to detect intensity of diffracted X-rays generated by reflection of the X-rays by the two-dimensional detector 12, and to calculate a residual stress on the basis of a diffraction ring formed by an intensity distribution of the diffracted X-rays which have been detected. In addition, the diffracted X-rays measurement device 10 is configured to be able to calculate a half width of an X-ray diffraction intensity curve based on the intensity distribution of the diffracted X-rays. The "half width of an X-ray diffraction intensity curve" as referred to means a width of a profile at an intensity value of half the peak of the X-ray diffraction intensity curve. The half width is reported to vary to reflect non-uniform strain caused by quenching, tempering, plastic deformation, and the like, and considered to be in correlation to, for example, hardness, plastic strain, and the like of the fillet portion 4. The half width may also be, for example, a value calculated for an arbitrary X-ray diffraction intensity curve constituting the diffraction ring, an average value of values calculated for a plurality of X-ray diffraction intensity curves constituting the diffraction ring, and the like.

The two-dimensional detector 12 is provided at an end on an X-ray emission side of the housing 13. That is to say, the two-dimensional detector 12 is provided at an end on a side facing a measurement site S. The two-dimensional detector 12 is exemplified by an imaging plate. The housing 13 has, for example, a substantially rectangular parallelepiped shape. The housing 13 has: the lower surface 13a adjacent to the axis portion 2; and the upper surface 13b facing the lower surface 13a and being adjacent to the flange portion 3. The irradiation unit 11 and the two-dimensional detector 12 are integrally provided through being arranged in the housing 13. A calculator 14 capable of using the diffraction ring to calculate the residual stress by the cos α method is connected to the housing 13. In addition, the calculator 14 is configured to be able to calculate a half width of an X-ray diffraction intensity curve based on the intensity distribution of the diffracted X-rays.

Positioning Device

As shown in FIG. 3, the positioning device 20 includes: a moving mechanism 21 that moves three-dimensionally the diffracted X-rays measurement device 10 relative to the fillet portion 4; and a rotation mechanism 22 that rotates the diffracted X-rays measurement device 10 in such a direction that an angle of incidence Ψ (see FIG. 2) of the X-rays with respect to the fillet portion 4 is changed. The moving mechanism 21 is connected to the axis portion 2 or the flange portion 3. The moving mechanism 21 is connected to the axis portion 2 in the present embodiment.

Moving Mechanism

The moving mechanism 21 includes: a first moving body 23 that fits to an outer peripheral face of the axial portion 2 and rotates in a circumferential direction relative to the axial portion 2; a perpendicular axis 24 that is connected to the first moving body 23 and extends in a direction orthogonal to the central axis of the axis portion 2; a second moving body 25 that is connected to the perpendicular axis 24 and movable in an axial direction of the perpendicular axis 24; and a slide mechanism 26 that moves the perpendicular axis 24 in an axial direction of the axis portion 2. the diffracted X-rays measurement device 10 is connected to the second moving body 25.

As shown in FIG. 3, the first moving body 23 includes: a frame 23a that fits to the outer peripheral face of the axial portion 2; a plurality of rollers 23c of which rotational axes 23b are arranged in parallel to the central axis of the axis portion 2 and that are in contact with the outer peripheral face of the axial portion 2; and a motor 23d that rotationally drives the plurality of rollers 23c. The first moving body 23 rotationally drives the plurality of rollers 23c by the motor 23d to rotate the diffracted X-rays measurement device 10 in a circumferential direction relative to the axis portion 2. The first moving body 23 may also rotate the axis portion 2 in a circumferential direction to rotate the diffracted X-rays measurement device 10 in a circumferential direction relative to the axis portion 2. Alternatively, in the measurement system 1, the first moving body 23 may rotate in the circumferential direction of the axis portion 2 to rotate the diffracted X-rays measurement device 10 in the circumferential direction relative to the axis portion 2.

The perpendicular axis 24 may be either directly connected to the first moving body 23, or connected to the first moving body 23 via another member. In the present embodiment, the perpendicular axis 24 is connected to the first moving body 23 via the slide mechanism 26.

The second moving body 25 is configured to fit to the perpendicular axis 24 and to be movable in the axial direction of the perpendicular axis 24 by a motor (not shown in the figure). The second moving body 25 is, for example, in a frame-like shape externally fitting to the perpendicular axis 24.

The slide mechanism 26 includes a supporting portion 26a that supports the perpendicular axis 24 in a slidable manner in the axial direction of the axis portion 2, and a motor (not shown in the figure) that drives the perpendicular axis 24 in the axial direction of the axis portion 2.

In the measurement system 1, due to the moving mechanism 21 including the first moving body 23, the perpendicular axis 24, the second moving body 25, and the slide mechanism 26, and the diffracted X-rays measurement device 10 being connected to the second moving body 25, the moving mechanism 21 is less likely to be hindered from arranging the diffracted X-rays measurement device 10 in a desired position. In other words, in a case of measuring the residual stress and the like of the fillet portion 4 by the diffracted X-rays measurement device 10, irradiation of the fillet portion 4 with X-rays in a desired arrangement may be difficult due to interference between the diffracted X-rays measurement device 10 or the positioning device 20, and the axis portion 2 or the flange portion 3. In this regard, due to the moving mechanism 21 having the above-described configuration, the measurement system 1 enables easy and reliable measurement of the residual stress and the like of the fillet portion 4 in a desired arrangement, while inhibiting interference between the diffracted X-rays measurement device 10 or the positioning device 20, and the axis portion 2 or the flange portion 3.

Rotation Mechanism

The rotation mechanism 22 includes: a connecting body 22a that connects the second moving body 25 and the diffracted X-rays measurement device 10; and a motor (not shown in the figure) that rotationally drives the connecting body 22a around an axis perpendicular to the central axis of the axis portion 2. The diffracted X-rays measurement device 10 is directly connected to the connecting body 22a, and connected to the second moving body 25 via the connecting body 22a.

Control Unit

The control unit 30 is configured to include, for example, a computer with: a CPU (Central Processing Unit) that carries out data processing; and a storage unit such as semiconductor memory that stores various types of data transitorily or permanently. The control unit 30 controls movement by the moving mechanism 21 and rotation by the rotation mechanism 22 such that the diffracted X-rays measurement device 10 does not come in contact with the axis portion 2 and the flange portion 3. Due to including the control unit 30, the measurement system 1 can easily measure the residual stress and the like of the fillet portion 4 in a desired arrangement.

The control unit 30 controls the movement by the moving mechanism 21 and the rotation by the rotation mechanism 22 within such a range that the diffracted X-rays measurement device 10 (more specifically, the two-dimensional detector 12) can detect a peak of diffracted X-rays. According to this configuration, the residual stress and the like of the fillet portion 4 can be measured easily and reliably.

A control procedure by the control unit 30 is described with reference to FIG. 2. The control unit 30 controls arrangement of the housing 13 by using a two-dimensional Cartesian coordinate system in which a coordinate of the fillet center P is represented by (0, 0), an axis passing through the fillet center P and being parallel to the central axis of the axis portion 2 is represented by an X-axis, and an axis passing through the fillet center P and being parallel to a protruding direction of the flange portion 3 is represented by a Z-axis.

The control unit 30 controls the arrangement of the diffracted X-rays measurement device 10 such that, in a case in which: a coordinate of a rotation center Q of the diffracted X-rays measurement device 10 is represented by (X, Z); an irradiation distance of the X-rays by the diffracted X-rays measurement device 10 is denoted by L [mm]; a minimum value of the irradiation distance L of the X-rays is denoted by $L_{min}$ [mm]; a maximum value of the irradiation distance L of the X-rays is denoted by $L_{max}$ [mm]; a fillet angle is denoted by θ [°]; a fillet radius is denoted by R [mm]; an angle of incidence of X-rays (an angle formed by an imaginary straight line N that passes through the measurement site S and the fillet center P; and the X-rays) is denoted by Ψ [°]; a distance between an end portion of the housing 13 on the fillet portion 4 side and the rotation center Q in the irradiation direction of the X-rays is denoted by h [mm]; a top-to-bottom width of an end portion of the housing 13 on a side adjacent to the fillet portion 4 (width between the lower surface 13a and the upper surface 13b) is denoted by W [mm]; a complementary angle of the Bragg angle is denoted by η [°]; a top-to-bottom width of the two-dimensional detector 12 is denoted by D [mm]; and an interval between the flange portion 3 and an imaginary straight line which passes through the fillet center P and is parallel to the flange portion 3 is denoted by a [mm], the following inequality 1 and inequality 2 are satisfied.

$$(L_{min}+h)\cos(\theta+\psi)-R\cos\theta \leq X \leq (L_{max}+h)\sin(\theta+\psi)-R\sin\theta \quad 1$$

$$(L_{min}+h)\cos(\theta+\psi)-R\cos\theta \leq Z \leq (L_{max}+h)\cos(\theta+\psi)-R\cos\theta \quad 2$$

With respect to the imaginary straight line N which passes through the measurement site S and the fillet center P, the angle of incidence Ψ of the X-rays is defined to be positive in a case of tilting toward the axis portion 2, and is defined to be negative in a case of tilting toward the flange portion 3: in a case in which Ψ≥0, the irradiation distance L of the X-rays satisfies the following inequality 3; and in a case in which Ψ<0, the irradiation distance L of the X-rays satisfies the following inequality 4.

$$\frac{-R(1-\cos\theta)+\frac{W}{2}\sin(\theta+\Psi)}{\cos(\theta+\Psi)} \leq L \leq \frac{D}{2\tan\eta} \quad 3$$

$$\frac{R\sin\theta+\frac{W}{2}\cos(\theta+\Psi)-a}{\sin(\theta+\Psi)} \leq L \leq \frac{D}{2\tan\eta} \quad 4$$

Due to positioning the diffracted X-rays measurement device 10 within a range that satisfies the above formulae 1 and 2, the measurement system 1 can easily inhibit contact of the axis portion 2 and the flange portion 3 with the diffracted X-rays measurement device 10.

It is preferred that, in a case in which Ψ≥0, the control unit 30 controls movement by the moving mechanism 21 and rotation by the rotation mechanism 22 on the basis of the following inequality 5.

$$Z \geq -R + h\cos(\theta+\Psi) + \frac{W}{2}\sin(\theta+\Psi). \quad 5$$

Meanwhile, it is preferred that, in a case in which Ψ<0, the control unit 30 controls movement by the moving mechanism 21 and rotation by the rotation mechanism 22 on the basis of the following inequality 6.

$$X \geq -a + h\sin(\theta+\Psi) + \frac{W}{2}\cos(\theta+\Psi). \quad 6$$

Due to thus controlling the movement by the moving mechanism 21 and the rotation by the rotation mechanism 22 on the basis of the above formulae 5 and 6, the measurement system 1 can measure the residual stress and the like of the fillet portion 4 easily and reliably, while contact of the axis portion 2 and the flange portion 3 with the diffracted X-rays measurement device 10 is inhibited.

Figure 4:
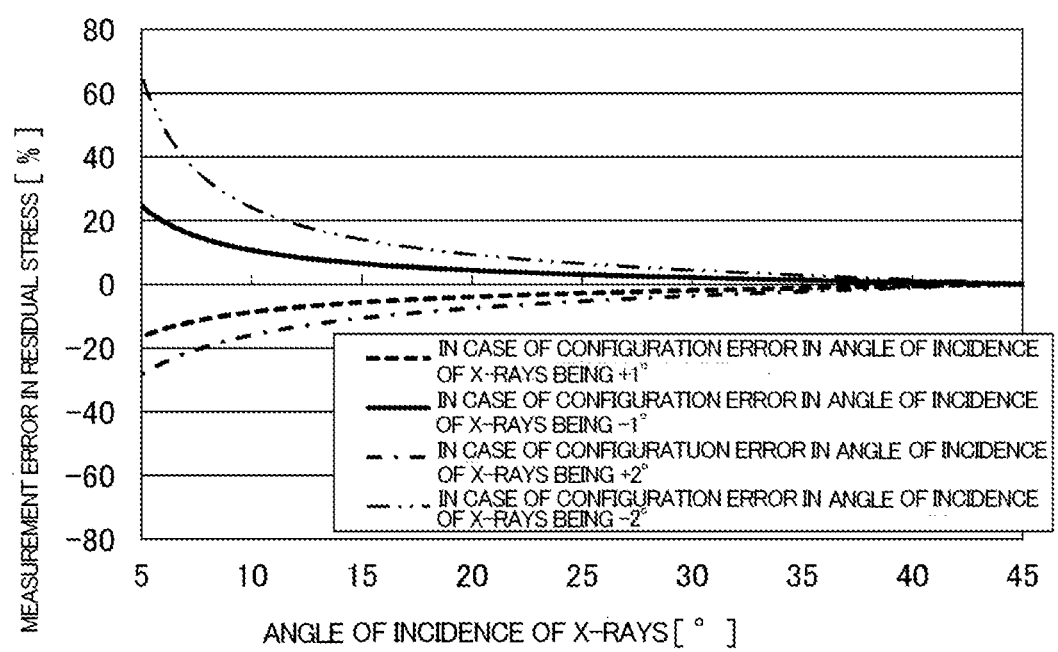
FIG. 4 is a graph showing a relationship between the angle of incidence Ψ of the X-rays and the measurement error in the residual stress.

FIG. 4 shows a relationship between the angle of incidence Ψ of the X-rays and the measurement error in the residual stress. As shown in FIG. 4, when the absolute value of the angle of incidence Ψ of the X-rays is smaller, an impact of a configuration error in the angle of incidence of the X-rays is greater. Particularly when the absolute value of the angle of incidence Ψ of the X-rays is less than 10°, an impact of the configuration error in the angle of incidence of the X-rays is remarkable. Therefore, it is preferred that the control unit 30 controls the arrangement of the housing 13 such that the absolute value of the angle of incidence Ψ of the X-rays is at least 10°, and preferably at least 20°.

In the measurement system 1, due to the control unit 30 that controls the movement mechanism 21 and the rotation mechanism 22, the housing 13 can be easily arranged so as to increase the absolute value of the angle of incidence Ψ of the X-rays. In other words, in a case of arranging the housing 13 manually, it is not easy to find an arrangement in which the absolute value of the angle of incidence Ψ of the X-rays is great in such a range that the housing 13 does not come into contact with the axis portion 2 and the flange portion 3. On the other hand, in the measurement system 1, due to the control unit 30 that controls the movement mechanism 21 and the rotation mechanism 22, the desired arrangement of the housing 13 can be automatically found, and the housing 13 can be moved and rotated to be in this arrangement.

It is preferred that, with respect to the fillet angle θ of the fillet portion 4, the control unit 30 derives such an irradiation distance L of the X-rays and such an angle of incidence Ψ of the X-rays that the diffracted X-rays measurement device 10 does not come into contact with the axis portion 2 and the flange portion 3. Specifically, the control unit 30 accepts, with respect to the particular fillet angle θ, inputs of the irradiation distance L of the X-rays and the angle of incidence Ψ of the X-rays desired by a user. When the irradiation distance L of the X-rays and the angle of incidence Ψ of the X-rays are input, the control unit 30 determines whether it is possible to arrange the housing 13 with the irradiation distance L of the X-rays and the angle of incidence Ψ of the X-rays being input by the user, on the basis of the above inequality 5 or 6. In a case in which it is possible to arrange the housing 13 with the irradiation distance L of the X-rays and the angle of incidence Ψ of the X-rays being input by the user, the control unit 30 moves and rotates the housing 13 in the arrangement corresponding to the input values, or notifies the user that the arrangement of the housing 13 is possible. According to this configuration, the residual stress and the like of the fillet portion 4 can be measured more easily in the desired arrangement.

It is preferred that the control unit 30 derives the irradiation distance L of the X-rays and the angle of incidence Ψ of the X-rays with which arrangement of the housing 13 is possible, for a plurality of fillet angles θ. In the measurement system 1, due to the control unit 30 that controls the movement mechanism 21 and the rotation mechanism 22, the residual stress of the fillet portion 4 can be calculated for a plurality of times in a desired arrangement and in a short period of time.

Note that, in a case of calculating the half width of the X-ray diffraction intensity curve, the diffracted X-rays measurement device 10 is not required to be arranged to increase the absolute value of the angle of incidence Ψ of the X-rays. For example, in a case of calculating the half width of the X-ray diffraction intensity curve, the angle of incidence Ψ of the X-rays may be 0°. However, in the measurement system 1, an arrangement of the diffracted X-rays measurement device 10 suited for calculating the residual stress of the fillet portion 4 facilitates calculation of both the residual stress of the fillet portion 4 and the half width of the X-ray diffraction intensity curve.

It is preferred that the control unit 30 controls the movement by the moving mechanism 21 and the rotation by the rotation mechanism 22 such that the diffracted X-rays measurement device 10 is rotated in the circumferential direction of the axis portion 2, or moved in a particular plane including the central axis of the axis portion 2.

The diffracted X-rays measurement device 10 may either deliver the X-rays continuously in parallel to positioning by the positioning device 20, or deliver the X-rays after positioning in a particular arrangement by the positioning device 20. Specific examples of the diffracted X-rays measurement device 10 delivering the X-rays continuously in parallel to positioning by the positioning device 20 include a configuration of delivering the X-rays while the diffracted X-rays measurement device 10 is relatively rotated in the circumferential direction of the axis portion 2. According to this configuration, the residual stress and the like of the fillet portion 4 can be measured easily and with high accuracy.

In a case in which the diffracted X-rays measurement device 10 has calculated the residual stress of the fillet portion 4 for a plurality of times, it is preferred that the diffracted X-rays measurement device 10 determines an average value of a plurality of calculated values (calculated values of the residual stress) by the calculator 14. Alternatively, in a case in which the diffracted X-rays measurement device 10 has calculated the half width of the X-ray diffraction intensity curve for a plurality of times, it is preferred that the diffracted X-rays measurement device 10 determines an average value of a plurality of calculated values (calculated values of the half width) by the calculator 14. Due to determining the average value of the plurality of calculated values by the calculator 14, the measurement system 1 can reduce the measurement error in the residual stress or the half width.

Figure 5:
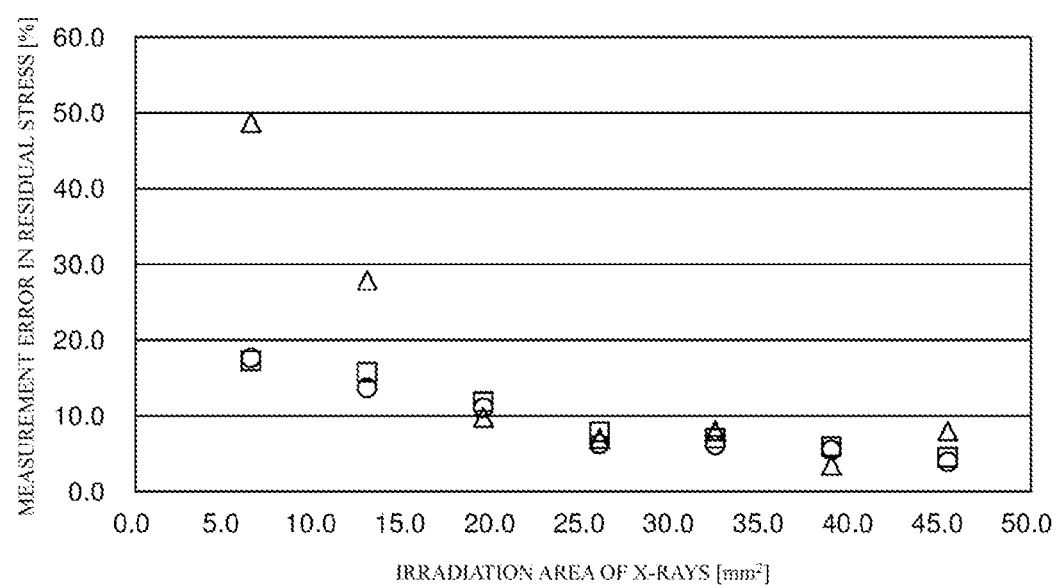
FIG. 5 is a graph showing a relationship between the irradiation area of the X-rays and the measurement error in the residual stress.

FIG. 5 shows a relationship between the irradiation area of the X-rays and the measurement error in the residual stress. In FIG. 5, a collimated diameter of letting through the X-rays is 1 mm, and an irradiation area of one point is about 6.5 mm². As shown in FIG. 5, increasing a total value of the irradiation area enables reduction in the measurement error in the residual stress. Particularly, the total value of the irradiation area being at least 25 mm² enables sufficient reduction in the measurement error in the residual stress. A method for increasing the total value of the irradiation area of the X-rays is exemplified by a method of delivering the X-rays for a plurality of times while arbitrarily changing the arrangement of the housing 13, a method of delivering the X-rays while swinging the housing 13 in the circumferential direction of the axis portion 2, a method of delivering the X-rays at a plurality of angles of incidence Ψ, and the like. Note that in FIG. 5, with regard to a segregation portion of a bainitic structure, a portion with no segregation of the bainitic structure, and a martensite structure, the X-rays are delivered for a plurality of times such that the respective total values of the irradiation areas are great.

Measuring Method

Next, the measurement method according to an embodiment of the present invention is described. The measurement method measures an intensity distribution of diffracted X-rays obtained by irradiating with X-rays a fillet portion 4 of a metallic structure M, the metallic structure M including: an axis portion 2; and a flange portion 3 protruding radially from the axis portion 2, in which the metallic structure M includes the fillet portion 4 in a connection portion between the axis portion 2 and the flange portion 3. The measurement method can be carried out by using the measurement system 1 illustrated in FIG. 1. Therefore, the measurement method using the measurement system 1 is described hereinafter.

The measurement method includes a step (moving step) of moving three-dimensionally the diffracted X-rays measurement device 10 relative to the fillet portion 4; a step (rotating step) of rotating the diffracted X-rays measurement device 10 in such a direction that an angle of incidence Ψ of the X-rays with respect to the fillet portion 4 is changed; and a step (measuring step) of measuring the intensity distribution of diffracted X-rays by the diffracted X-rays measurement device 10. The measurement method may include, after the measuring step, a step (repeating step) of repeating: at least one of the moving step and the rotating step; and the measuring step. The measurement method may also include a step (average value calculating step) of determining an average value of a plurality of calculated values determined by the measuring step (a plurality of calculated values of the residual stress or a plurality of calculated values of the half width).

Moving Step

In the moving step, the housing 13 is moved to a desired position by the control unit 30 that controls the moving mechanism 21.

Rotating Step

In the rotating step, the housing 13 is rotated to a desired angle by the control unit 30 rotating the rotation mechanism 22. Note that the moving step and the rotating step may take place either one after another or simultaneously.

Measuring Step

In the measuring step, the residual stress of the fillet portion 4 is calculated by the cos α method. Specifically, in the measuring step, the residual stress is calculated on the basis of a diffraction ring generated by Bragg diffraction of the X-rays delivered from the diffracted X-rays measurement device 10 to the fillet portion 4 (more specifically, the measurement site S). In addition, in the measuring step, the half width of the X-ray diffraction intensity curve based on the intensity distribution of the diffracted X-rays is calculated.

The measuring step may be configured to, for example, irradiate the fillet portion 4 with X-rays in the arrangement after the moving step and the rotating step, detect by the two-dimensional detector 12 the diffraction ring generated by Bragg diffraction of the X-rays delivered, and calculate the residual stress by the calculator 14 using the cos α method. Alternatively, the measuring step may be configured to irradiate the fillet portion 4 with X-rays in the arrangement after the moving step and the rotating step, and calculate the half width of the X-ray diffraction intensity curve.

Yet alternatively, the measuring step may be configured to continuously irradiate the fillet portion with X-rays in parallel with at least one of the moving step and the rotating step, and obtain a single diffraction ring, which is given by overlapping a plurality of diffraction rings generated by diffraction of the X-rays. In this case, in the measuring step, the residual stress may be calculated on the basis of the single diffraction ring thus obtained. More specifically, it may be configured that the diffracted X-rays measurement device 10 constantly delivers X-rays to a continuously connected portion of the fillet portion 4 in parallel to at least one of the moving step and the rotating step, the two-dimensional detector 12 detects a single diffraction ring, which is given by overlapping a plurality of diffraction rings generated by diffraction of each of the X-rays at the fillet portion 4, and the residual stress is calculated on the basis of the single diffraction ring in the measuring step. A configuration of continuously delivering X-rays to the fillet portion 4 in parallel to at least one of the moving step and the rotating step is exemplified by a method of continuously delivering X-rays to the fillet portion 4 while relatively rotating the diffracted X-rays measurement device 10 in the circumferential direction of the axis portion 2. Due to calculating the residual stress on the basis of the single diffraction ring in the measuring step, the measurement method enables easily measuring, with high accuracy, the residual stress of the fillet portion 4. Alternatively, the measuring method may be configured to calculate the half width on the basis of the single diffraction ring (in other words, on the basis of the X-ray diffraction intensity curve obtained by continuously delivering X-rays to the fillet portion 4 in parallel to at least one of the moving step and the rotating step). Note that, in a case of calculating the residual stress and the like on the basis of the single diffraction ring in the measuring step, the measurement method is not required to include the repeating step and the average value calculating step described later.

Repeating Step

In the repeating step, the arrangement of the housing 13 with respect to the fillet portion 4 is changed by carrying out at least one of the moving step and the rotating step after the measuring step. In the repeating step, the residual stress of the fillet portion 4 is calculated by delivering the X-rays from the diffracted X-rays measurement device 10 in the arrangement thus changed. Since the residual stress of the fillet portion 4 is typically distributed in a certain manner, carrying out the repeating step facilitates comprehension of the distribution of the residual stress. In addition, in the repeating step, the half width of the X-ray diffraction intensity curve is calculated by delivering X-rays from the diffracted X-rays measurement device 10 in the changed arrangement. Since the half width of the X-ray diffraction intensity curve may vary depending on the irradiation position of the X-rays, the repeating step facilitates more accurate comprehension of the half width.

The number of repetitions by the repeating step is arbitrary, and may be one. However, as shown in FIG. 5, in light of sufficiently reducing the measurement error in the residual stress, the repeating step is preferably carried out repeatedly until the total value of the irradiation area of the X-rays is at least 25 mm$^2$. In the repeating step, the residual stress may be calculated at a plurality of angles of incidence $\Psi$ while changing the angle of incidence $\Psi$ of the X-rays with respect to one measurement site S. For example, in the repeating step, the residual stress may be calculated at a plurality of angles of incidence $\Psi$ while changing the angle of incidence $\Psi$ of the X-rays by 10°.

Average Value Calculating Step

In the average value calculating step, an average value of values calculated by the measuring step carried out for a plurality of times including those of the repeating step. In the measurement method, the average value (average value of the residual stress) is calculated as the residual stress of the fillet portion 4. In addition, in the measurement method, the average value (average value of the half width) is calculated as the half width of the X-ray diffraction intensity curve. Due to including the average value calculating step, the measurement method enables easy measurement of the residual stress and the half width with reduced measurement errors.

Advantages

The measurement system 1 includes the positioning device 20 that positions the diffracted X-rays measurement device 10 with respect to the fillet portion 4, the positioning device 20 including: the moving mechanism 21 that moves three-dimensionally the diffracted X-rays measurement device 10 relative to the fillet portion 4; and the rotation mechanism 22 that rotates the diffracted X-rays measurement device 10 in such a direction that the angle of incidence $\Psi$ of the X-rays with respect to the fillet portion 4 is changed, whereby an intensity distribution of diffracted X-rays obtained by irradiating the fillet portion 4 with X-rays can be easily measured in a desired arrangement.

The measurement system 1 being able to easily measure the intensity distribution of the diffracted X-rays in a desired arrangement is suited for calculating the residual stress of the fillet portion 4. In other words, the fillet portion 4 typically has a distribution of the residual stress in a direction of change of the angle of incidence $\Psi$ of the X-rays, the circumferential direction of the axis portion 2, and the like. The measurement system 1 enables positioning of the diffracted X-rays measurement device 10 with high accuracy in a short period of time, thus facilitating measurement of the residual stress in a plurality of positions in the fillet portion 4. As a result, the distribution of the residual stress of the fillet portion 4 can be easily comprehended.

In addition, the measurement system 1 being able to easily measure the intensity distribution of the diffracted X-rays in a desired arrangement is suited for calculating the half width of the X-ray diffraction intensity curve.

Due to the measurement method including a step of moving three-dimensionally the diffracted X-rays measurement device 10 relative to the fillet portion 4; and a step of rotating the diffracted X-rays measurement device 10 in such a direction that an angle of incidence Ψ of the X-rays with respect to the fillet portion 4 is changed, an intensity distribution of diffracted X-rays obtained by irradiating the fillet portion 4 with X-rays can be easily measured in a desired arrangement.

The measurement method being able to easily measure the intensity distribution of the diffracted X-rays in a desired arrangement is suited for calculating the residual stress of the fillet portion 4. In addition, the measurement method being able to easily measure the intensity distribution of the diffracted X-rays in a desired arrangement is suited for calculating the half width of the X-ray diffraction intensity curve.

Other Embodiments

The above-described embodiments do not limit the configuration of the present invention. Therefore, in the above-described embodiments, the components of each part of the above-described embodiments can be omitted, replaced, or added based on the description in the present specification and general technical knowledge, and such omission, replacement, or addition should be construed as falling within the scope of the present invention.

Figure 6:
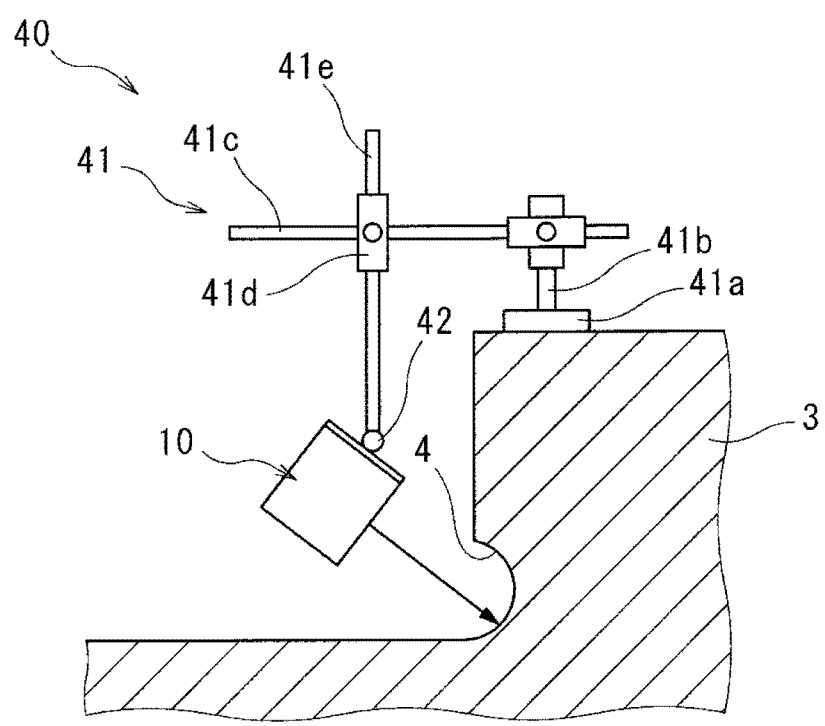
FIG. 6 is a schematic side view illustrating a state of the measurement system according to an embodiment different from the measurement system in FIG. 1 in use.

The configuration of the positioning device is not limited to the configuration of the above-described embodiments. For example, in the positioning device, the moving mechanism may be connected to the flange portion. With reference to FIG. 6, an example of the configuration in which the moving mechanism is connected to the flange portion is described. In the positioning device 40 illustrated in FIG. 6, a moving mechanism 41 is connected to an upper face of the flange portion 3. The moving mechanism 41 includes: a support base 41a that is arranged on the upper face of the flange portion 3; a first supporting rod 41b that protrudes upward from the support base 41a and is rotatable in a circumferential direction; a second supporting rod 41c that is connected to the first supporting rod 41b and extends in a direction orthogonal to the first supporting rod 41b; a moving body 41d that is connected to the second supporting rod 41c and movable in an axial direction of the second supporting rod 41c; and a third supporting rod 41e that is connected to the moving body 41d, arranged in parallel to the first supporting rod 41b, and movable in a top-to-bottom direction. The diffracted X-rays measurement device 10 is connected to a lower portion of the third supporting rod 41e via the rotation mechanism 42. In the configuration of FIG. 6 as well, the measurement system enables measurement of the residual stress and the like of the fillet portion 4 in a desired arrangement.

In the above-described embodiments, the configuration in which the slide mechanism moves the perpendicular axis in the axial direction of the axis portion has been described. However, the measurement system may also be configured such that the slide mechanism moves the first moving body in the axial direction of the axis portion.

The measurement system may also be configured not to include the above-described control unit. For example, the measurement system may also be configured to arrange the diffracted X-rays measurement device in a desired position by means of the moving mechanism and the rotation mechanism operated by a user. In addition, even in a case in which the measurement system includes the control unit, the specific control procedure by the control unit is not limited to the configuration of the above-described embodiments. For example, the control unit may control the moving mechanism and the rotation mechanism to arrange the diffracted X-rays measurement device such that the angle of incidence Ψ of the X-rays approaches ±35° with respect to a particular fillet angle.

The measurement system and the measurement method may also be configured to enable calculation of only one of the residual stress of the fillet portion and the half width of the X-ray diffraction intensity curve. Alternatively, the measurement system and the measurement method may also be configured to calculate a value other than the residual stress of the fillet portion and the half width of the X-ray diffraction intensity curve.

As described above, in light of reducing the measurement error, it is preferred that the measurement method calculates the residual stress and the like of the fillet portion in a plurality of arrangements. However, in a case in which the absolute value of the angle of incidence Ψ of the X-rays can be sufficiently increased or the like, the measurement method may determine the residual stress and the like of the fillet portion from a value of only one desired point. In such a case, the measurement method is not required to include the repeating step and the average value calculating step described above.

Examples

Hereinafter, the present invention is described in detail by way of Examples, but the present invention should not be construed as being limited to description in the Examples.

By the measurement system 1 of FIG. 1, the residual stress of the fillet portion 4 of the metallic structure M including the axis portion 2 and the flange portion 3 protruding radially from the axis portion 2 was measured by the cos α method. As the diffracted X-rays measurement device 10, an X-ray stress measuring apparatus was used in which a top-to-bottom width D of the detection region of the two-dimensional detector 12 was 70 mm, and a top-to-bottom width of the housing 13 was 102 mm. The fillet radius R of the fillet portion 4 was 29 mm, the complementary angle η of the Bragg angle was 23.6°, and the interval a between the flange portion 3 and the imaginary straight line which passes through the fillet center P and is parallel to the flange portion 3 was 8 mm.

Figure 7:
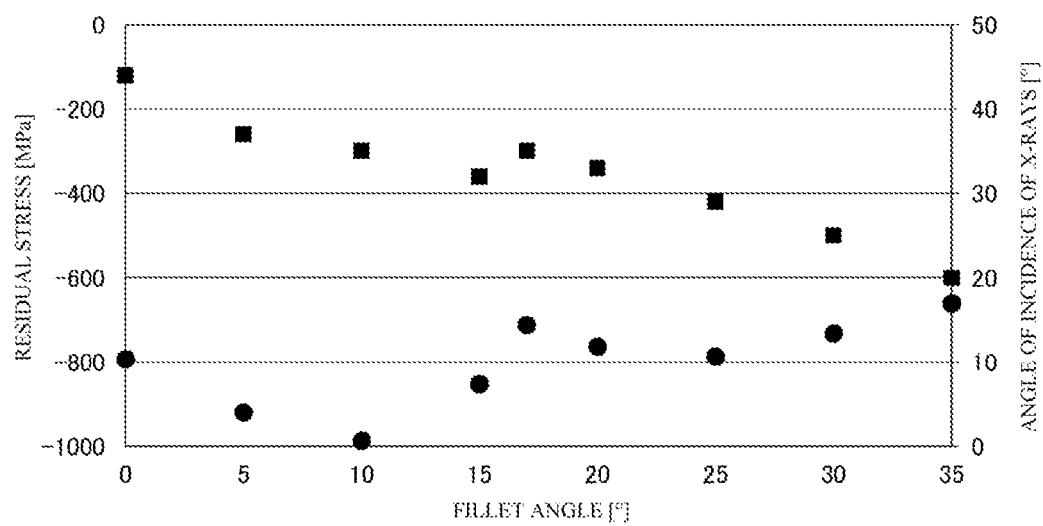
FIG. 7 is a graph showing a measured result of the residual stress using the measurement system in FIG. 1.

FIG. 7 shows measurement results of the residual stress using the measurement system 1. In FIG. 7, with respect to a plurality of fillet angles θ, the control unit 30 derives such an irradiation distance L of the X-rays and such an angle of incidence Ψ of the X-rays that the diffracted X-rays measurement device 10 does not come into contact with the axis portion 2 and the flange portion 3, and the residual stress of the fillet portion 4 is measured in the arrangement thus derived. As shown in FIG. 7, due to using the measurement system 1, the residual stress can be automatically measured for a plurality of fillet angles θ.

Figure 8:
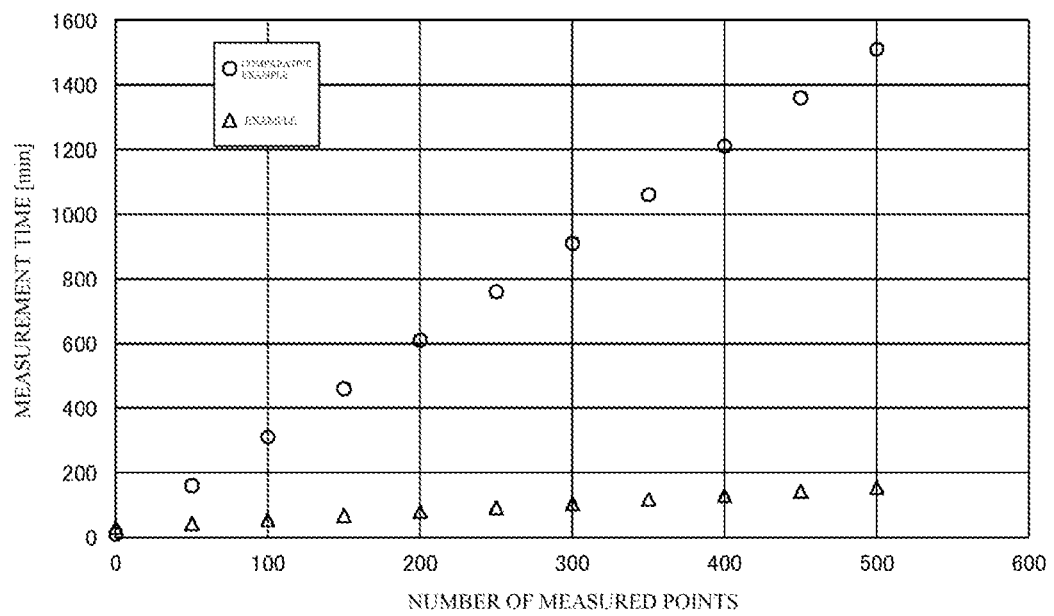
FIG. 8 is a graph showing a relationship between the number of measured points and the measurement time in Example and Comparative Example.

FIG. 8 shows a relationship between the number of measured points and the measuring time in a case of using the measurement system 1 (Example) and in a case of arranging the housing manually without using the measurement system 1 (Comparative Example). As shown in FIG. 8, when the number of measured points is greater, using the measurement system 1 enables greater reduction of the measuring time.

Figure 9:
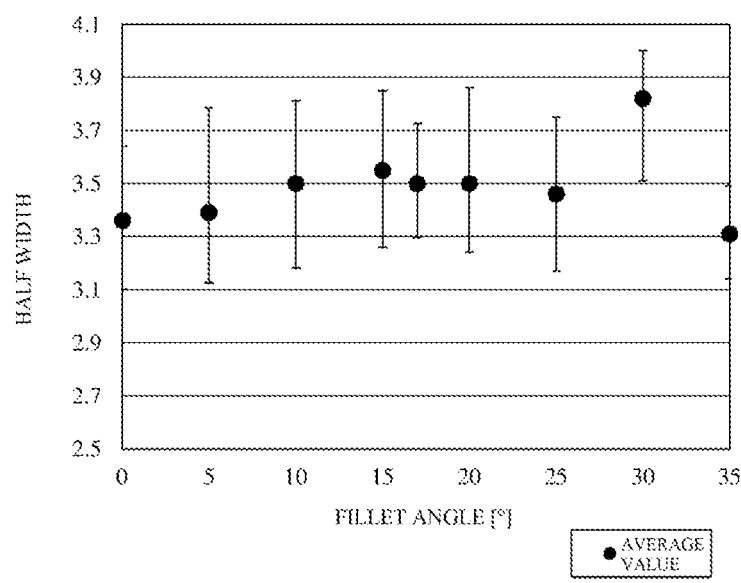
FIG. 9 is a graph showing the half width calculated from the X-ray diffraction intensity curve obtained in the arrangement derived by the measurement in FIG. 7.

In addition, FIG. 9 shows the half width calculated from the X-ray diffraction intensity curve obtained with the arrangement derived by the measurement in FIG. 7. In FIG. 9, an error bar indicates a range between the maximum value and the minimum value of the half width of the X-ray diffraction intensity curve constituting the diffraction ring, and each dot indicates an average value of the half width. FIG. 9 indicates that the measurement system 1 enables calculation of the half width of the X-ray diffraction intensity curve.

INDUSTRIAL APPLICABILITY

As described above, the measurement system according to the one aspect of the present invention is suited for measuring the residual stress and the like of the fillet portion.

EXPLANATION OF THE REFERENCE SYMBOLS

1 Measurement system
2 Axis portion
3 Flange portion
4 Fillet portion
10 Diffracted X-rays measurement device
11 Irradiation unit
12 Two-dimensional detector
13 Housing
13a Lower surface
13b Upper surface
14 Calculator
20, 40 Positioning device
21, 41 Moving mechanism
22, 42 Rotation mechanism
22a Connecting body
23 First moving body
23a Frame
23b Rotational axis
23c Roller
23d Motor
24 Perpendicular axis
25 Second moving body
26 Slide mechanism
26a Supporting portion
30 Control unit
41a Supporting base
41b First supporting rod
41c Second supporting rod
41d Moving body
41e Third supporting rod
a Interval between flange portion and imaginary straight line which passes through fillet center and is parallel to flange portion
D Top-to-bottom width of detection region of two-dimensional detector
h Distance between end portion of housing on fillet portion side and rotation center in irradiation direction of X-rays
L Irradiation distance of X-rays
M Metallic structure
N Imaginary straight line which passes through measurement site and fillet center
P Fillet center
Q Rotation center of diffracted X-rays measurement device
R Fillet radius
S Measurement site
W Top-to-bottom width of end portion of housing on side adjacent to fillet portion θ Fillet angle
Ψ Angle of incidence of X-rays
η Complementary angle of Bragg angle

The invention claimed is:
1. A measurement system enabling measurement of an intensity distribution of diffracted X-rays obtained by irradiating a fillet portion of a metallic structure with X-rays, the metallic structure comprising: an axis portion; and a flange portion protruding radially from the axis portion, wherein the metallic structure comprises the fillet portion in a connection portion between the axis portion and the flange portion, the measurement system comprising:
a diffracted X-rays measurement device provided with an irradiation unit that irradiates the fillet portion with X-rays; and
a positioning device that positions the diffracted X-rays measurement device with respect to the fillet portion, wherein
the positioning device comprises:
a moving mechanism that moves three-dimensionally the diffracted X-rays measurement device relative to the fillet portion; and
a rotation mechanism that rotates the diffracted X-rays measurement device in such a direction that an angle of incidence of the X-rays with respect to the fillet portion is changed,
wherein a control unit controls movement by the moving mechanism and rotation by the rotation mechanism such that the diffracted X-rays measurement device does not come into contact with the axis portion and the flange portion,
wherein the control unit controls the movement by the moving mechanism and the rotation by the rotation mechanism within such a range that the diffracted X-rays measurement device can detect a peak of diffracted X-rays,
wherein, in a case in which: an axis passing through a fillet center and being parallel to a central axis of the axis portion is represented by an X-axis; an axis passing through the fillet center and being parallel to a protrusion direction of the flange portion is represented by a Z-axis: a coordinate of the fillet center is represented by (0, 0); a coordinate of a rotation center of the diffracted X-rays measurement device is represented by (X, Z); an irradiation distance of the X-rays by the diffracted X-rays measurement device is denoted by L [mm]; a minimum value of the irradiation distance of the X-rays is denoted by $L_{min}$ [mm]; a maximum value of the irradiation distance of the X-rays is denoted by $L_{max}$ [mm]; a fillet angle is denoted by θ [°]; a fillet radius is denoted by R [mm]; an angle of incidence of the X-rays is denoted by Ψ [°]; a distance between an end portion of a housing of the diffracted X-rays measurement device on the fillet portion side and the rotation center in the irradiation direction of the X-rays is denoted by h [mm]; a top-to-bottom width of an end portion of the housing on a side adjacent to the fillet portion is denoted by W [mm]: a complementary angle of the Bragg angle is denoted by η [°]; a top-to-bottom width of a detection region of a two-dimensional detector of the diffracted X-rays measurement device is denoted by D [mm]; and an interval between the flange portion and an imaginary straight line which passes through the fillet center and is parallel to the flange portion is denoted by a [mm], the control unit controls the movement and rotation such that inequality 1 and inequality 2 are satisfied:

$$(L_{min}+h)\sin(\theta+\psi)-R\sin\theta \leq X \leq (L_{max}+h)\sin(\theta+\psi)-R\sin\theta \quad 1$$

$$(L_{min}+h)\cos(\theta+\psi)-R\cos\theta \leq Z \leq (L_{max}+h)\cos(\theta+\psi)-R\cos\theta \quad 2$$

wherein with respect to an imaginary straight line which passes through a measurement site and the fillet center, the angle of incidence $\Psi$ of the X-rays is defined to be positive in a case of tilting toward the axis portion, and is defined to be negative in a case of tilting toward the flange portion: in a case in which $\Psi \geq 0$, the irradiation distance L of the X-rays satisfies inequality 3; and in a case in which $\Psi < 0$, the irradiation distance L of the X-rays satisfies inequality 4:

$$\frac{-R(1-\cos\theta)+\frac{W}{2}\sin(\theta+\Psi)}{\cos(\theta+\Psi)} \leq L \leq \frac{D}{2\tan\eta} \quad 3$$

$$\frac{R\sin\theta+\frac{W}{2}\cos(\theta+\Psi)-a}{\sin(\theta+\Psi)} \leq L \leq \frac{D}{2\tan\eta}. \quad 4$$

2. The measurement system according to claim 1, wherein the control unit controls the movement by the moving mechanism and the rotation by the rotation mechanism on basis of inequality 5 in a case in which $\Psi \geq 0$, and controls the movement by the moving mechanism and the rotation by the rotation mechanism on basis of inequality 6 in a case in which $\Psi < 0$, $$Z \geq -R + h\cos(\theta+\Psi) + \frac{W}{2}\sin(\theta+\Psi) \quad 5$$

$$X \geq -a + h\sin(\theta+\Psi) + \frac{W}{2}\cos(\theta+\Psi). \quad 6$$

3. The measurement system according to claim 1, wherein the moving mechanism comprises:
 a first moving body that fits to an outer peripheral face of the axial portion and rotates in a circumferential direction relative to the axial portion;
 a perpendicular axis that is connected to the first moving body and extends in a direction orthogonal to the central axis of the axis portion;
 a second moving body that is connected to the perpendicular axis and movable in an axial direction of the perpendicular axis; and
 a slide mechanism that moves the first moving body or the perpendicular axis in an axial direction of the axis portion,
 wherein
 the diffracted X-rays measurement device is connected to the second moving body.

4. The measurement system according to claim 1, wherein the diffracted X-rays measurement device is configured to be able to calculate a residual stress of the fillet portion by the cos α method.

5. The measurement system according to claim 1, wherein the diffracted X-rays measurement device is configured to be able to calculate a half width of an X-ray diffraction intensity curve.

6. A measurement method enabling measurement of an intensity distribution of diffracted X-rays obtained by irradiating a fillet portion of a metallic structure with X-rays, the metallic structure comprising: an axis portion; and a flange portion protruding radially from the axis portion, wherein the metallic structure comprises the fillet portion in a connection portion between the axis portion and the flange portion,
 the measurement method using a diffracted X-rays measurement device provided with an irradiation unit that irradiates the fillet portion with X-rays, and comprising:
 moving three-dimensionally the diffracted X-rays measurement device relative to the fillet portion;
 rotating the diffracted X-rays measurement device in such a direction that an angle of incidence of the X-rays with respect to the fillet portion is changed; and
 measuring the intensity distribution of diffracted X-rays by the diffracted X-rays measurement device,
 wherein a control unit controls the moving and rotating such that the diffracted X-rays measurement device does not come into contact with the axis portion and the flange portion,
 wherein the control unit controls the moving and the rotation within such a range that the diffracted X-rays measurement device can detect a peak of diffracted X-rays,
 wherein, in a case in which: an axis passing through a fillet center and being parallel to a central axis of the axis portion is represented by an X-axis; an axis passing through the fillet center and being parallel to a protrusion direction of the flange portion is represented by a Z-axis: a coordinate of the fillet center is represented by (0, 0); a coordinate of a rotation center of the diffracted X-rays measurement device is represented by (X, Z); an irradiation distance of the X-rays by the diffracted X-rays measurement device is denoted by L [mm]; a minimum value of the irradiation distance of the X-rays is denoted by $L_{min}$ [mm]; a maximum value of the irradiation distance of the X-rays is denoted by $L_{max}$ [mm]; a fillet angle is denoted by $\theta$ [°]; a fillet radius is denoted by R [mm]; an angle of incidence of the X-rays is denoted by $\Psi$ [°]; a distance between an end portion of a housing of the diffracted X-rays measurement device on the fillet portion side and the rotation center in the irradiation direction of the X-rays is denoted by h [mm]; a top-to-bottom width of an end portion of the housing on a side adjacent to the fillet portion is denoted by W [mm]; a complementary angle of the Bragg angle is denoted by $\eta$ [°]; a top-to-bottom width of a detection region of a two-dimensional detector of the diffracted X-rays measurement device is denoted by D [mm]; and an interval between the flange portion and an imaginary straight line which passes through the fillet center and is parallel to the flange portion is denoted by a [mm], the control unit controls the moving and rotating such that inequality 1 and inequality 2 are satisfied:

$$(L_{min}+h)\sin(\theta+\psi)-R\sin\theta \leq X \leq (L_{max}+h)\sin(\theta+\psi)-R\sin\theta \quad 1$$

$$(L_{min}+h)\cos(\theta+\psi)-R\cos\theta \leq Z \leq (L_{max}+h)\cos(\theta+\psi)-R\cos\theta \quad 2$$

wherein with respect to an imaginary straight line which passes through a measurement site and the fillet center, the angle of incidence $\Psi$ of the X-rays is defined to be positive in a case of tilting toward the axis portion, and is defined to be negative in a case of tilting toward the flange portion: in a case in which $\Psi \geq 0$, the irradiation distance L of the X-rays satisfies inequality 3; and in a case in which $\Psi < 0$, the irradiation distance L of the X-rays satisfies inequality 4:

$$\frac{-R(1-\cos\theta) + \frac{W}{2}\sin(\theta+\Psi)}{\cos(\theta+\Psi)} \leq L \leq \frac{D}{2\tan\eta}$$

$$\frac{R\sin\theta + \frac{W}{2}\cos(\theta+\Psi) - a}{\sin(\theta+\Psi)} \leq L \leq \frac{D}{2\tan\eta}.$$

7. The measurement method according to claim 6, wherein, in the measurement, the residual stress of the fillet portion is calculated by the cos α method.

8. The measurement method according to claim 7, wherein:
   the fillet portion is continuously irradiated with X-rays in parallel with at least one of the moving and the rotating; and
   in the measurement, a single diffraction ring, which is given by overlapping a plurality of diffraction rings generated by diffraction of the X-rays, is determined.

9. The measurement method according to claim 7 comprising, after the measuring, repeating: at least one of the moving and the rotating, and the measuring.

10. The measurement method according to claim 9, further comprising determining an average value of a plurality of calculated values obtained by the measuring.

11. The measurement method according to claim 6, wherein, in the measurement, a half width of an X-ray diffraction intensity curve is calculated.

\* \* \* \* \*